United States Patent
Wadi

(10) Patent No.: US 12,349,837 B1
(45) Date of Patent: Jul. 8, 2025

(54) AIR FRYER SYSTEM

(71) Applicant: Ghada Wadi, Anaheim, CA (US)

(72) Inventor: Ghada Wadi, Anaheim, CA (US)

( * ) Notice: Subject to any disclaimer, the term of this patent is extended or adjusted under 35 U.S.C. 154(b) by 43 days.

(21) Appl. No.: 18/535,238

(22) Filed: Dec. 11, 2023

Related U.S. Application Data

(60) Provisional application No. 63/431,728, filed on Dec. 11, 2022.

(51) Int. Cl.
*A47J 37/06* (2006.01)
*A47J 36/20* (2006.01)

(52) U.S. Cl.
CPC ........... *A47J 37/0664* (2013.01); *A47J 36/20* (2013.01); *A47J 37/0641* (2013.01)

(58) Field of Classification Search
CPC ..... A47J 37/0664; A47J 36/20; A47J 37/0641
See application file for complete search history.

(56) References Cited

U.S. PATENT DOCUMENTS

| | | | | |
|---|---|---|---|---|
| 2004/0216730 A1* | 11/2004 | Sawhney | ............. | A47J 37/0611 126/1 R |
| 2006/0162575 A1* | 7/2006 | Lee | .................... | A47J 37/0676 99/450 |
| 2008/0105137 A1* | 5/2008 | Genslak | ............... | A47J 37/0611 99/376 |
| 2009/0087534 A1* | 4/2009 | McLemore | ......... | A47J 37/1209 426/523 |
| 2012/0055346 A1* | 3/2012 | Navare | ................... | A47J 37/10 99/446 |
| 2017/0340166 A1* | 11/2017 | Wu | ....................... | A47J 37/0611 |
| 2020/0008621 A1* | 1/2020 | Choi | ................... | B01D 47/027 |
| 2022/0313016 A1* | 10/2022 | Chow | .................. | A47J 37/128 |

FOREIGN PATENT DOCUMENTS

| | | | |
|---|---|---|---|
| CN | 211355052 U | * | 8/2020 |
| CN | 218419504 U | * | 2/2023 |

OTHER PUBLICATIONS

CN218419504U—translation (Year: 2025).*
CN211355052U—translation (Year: 2025).*
IP.com search history (Year: 2025).*

* cited by examiner

*Primary Examiner* — Elizabeth M Kerr
*Assistant Examiner* — Keith Brian Assante
(74) *Attorney, Agent, or Firm* — Plager Schack LLP; Mark H. Plager; Naomi Mann

(57) ABSTRACT

Disclosed is an air fryer system, including a base insert comprising an outer bottom circular ring disk, and a gridded food support surface, wherein the gridded food support surface includes a plurality of ribs forming side walls and a circular top surface, wherein the ribs alternate in alignment across the four quarters of the circular top surface. In some embodiments, the base insert may include inner supports forming circular rings extending from a bottom side of the circular top surface to the bottom of the base insert, the circular rings being concentric with, but smaller and higher than the outer bottom circular ring disk.

2 Claims, 5 Drawing Sheets

AIR FRYER SYSTEM

RELATED APPLICATION

This application claims benefit to U.S. Provisional Application No. 63/431,728 filed Dec. 11, 2023, which is incorporated by reference herein in its entirety.

BACKGROUND

The present disclosure relates generally to air fryer systems.

An air fryer system may comprise a pot or pan in which an elevated base comprising openings is inserted. A food item is then placed on top of the base for cooking. The base is intended to elevate the food item away from the bottom of the pot, whereby the openings allow the fat of the food item to drain into the bottom of the pan during cooking, so that the fat is separated from the food item for healthier cooking. As air fryers are becoming commonly used, an improved air fryer system is desirable.

SUMMARY

According to various embodiments, disclosed is an air fryer system, including a base insert comprising an outer bottom circular ring disk, and a gridded food support surface. In certain embodiments, the gridded food support surface includes a plurality of ribs forming side walls and a circular top surface, wherein the ribs alternate in alignment across the four quarters of the circular top surface. In some embodiments, the base insert may include inner supports forming circular rings extending from a bottom side of the circular top surface to the bottom of the base insert, the circular rings being concentric with, but smaller and higher than the outer bottom circular ring disk.

BRIEF DESCRIPTION OF THE FIGURES

The detailed description of some embodiments of the invention will be made below with reference to the accompanying figures, wherein the figures disclose one or more embodiments of the present invention.

DETAILED DESCRIPTION OF CERTAIN EMBODIMENTS

Figure 1:
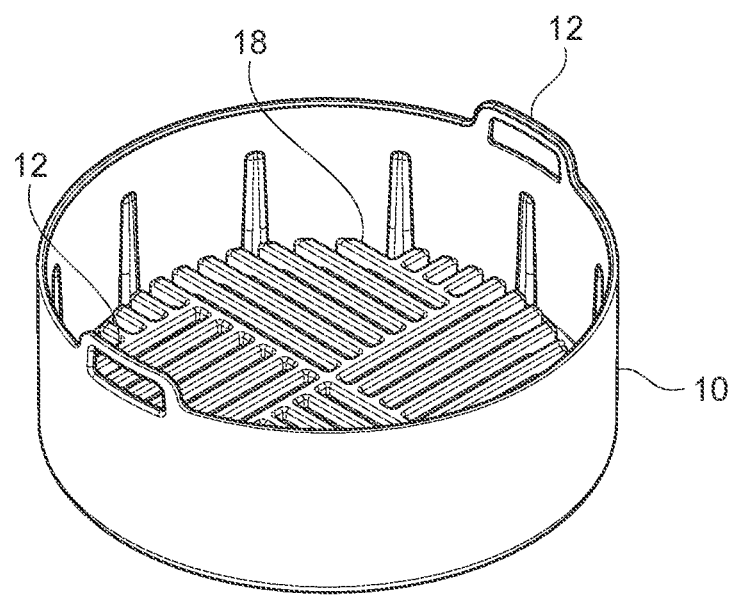
FIG. 1 is a top perspective view of an air fryer system including pot and base insert, according to various embodiments.
Figure 2:
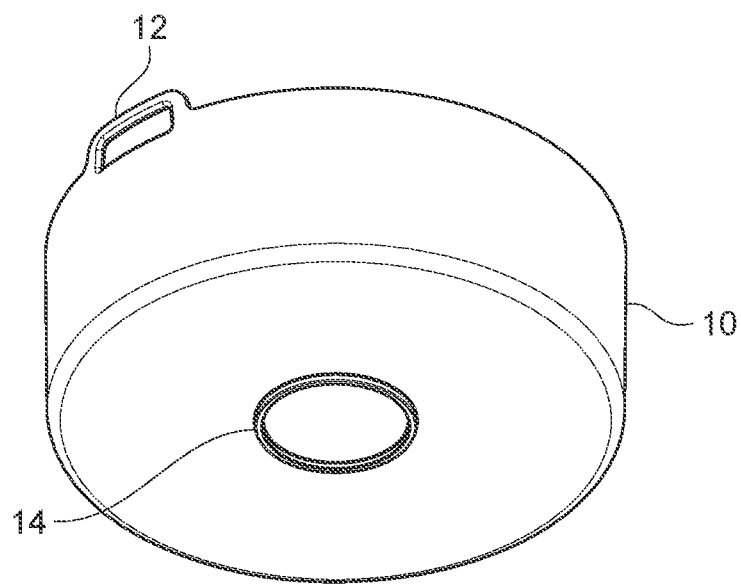
FIG. 2 is a bottom perspective view of the pot of the air fryer system.
Figure 3:
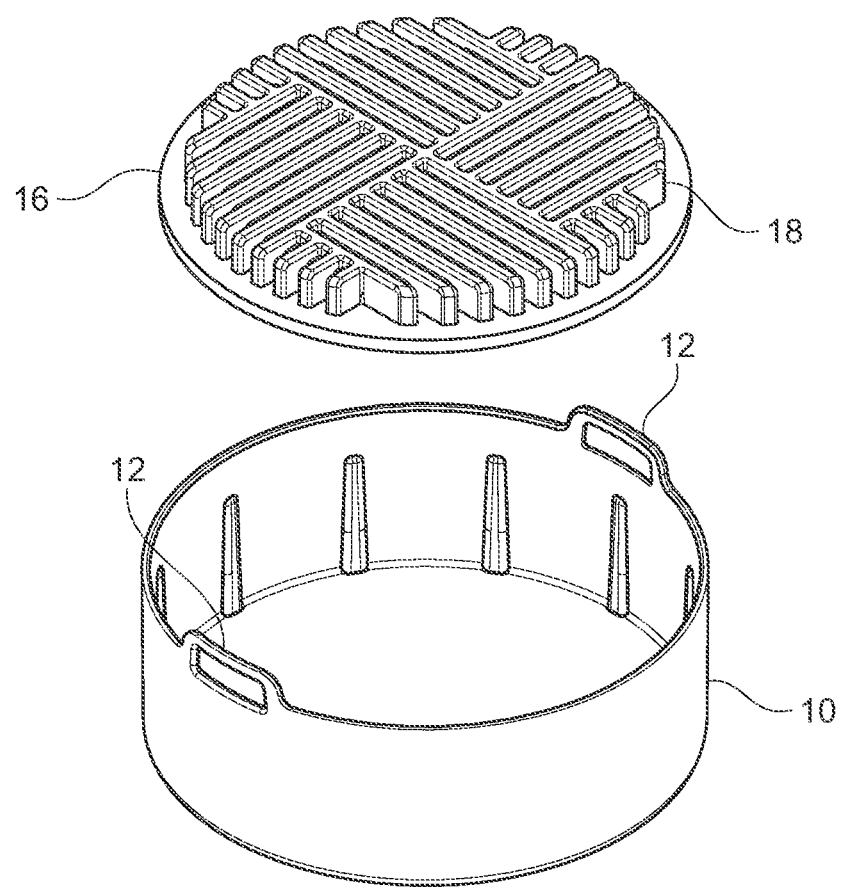
FIG. 3 shows the base insert removed from the pot.

As depicted in FIGS. 1-11, the disclosed subject matter introduces an improved air fryer system. In embodiments as depicted in FIGS. 1-8, the air fryer system may comprise a pot 10 and trivet 16 comprising ridges 18. Trivet 16 (also referred to as "base insert 16") is designed to insert in pot 10 and to be removed from pot 10. In certain embodiments, pot 10 and trivet 16 may be used with an air fryer 20 and air fryer basket 22. In some embodiments, pot 10 and trivet 16 may be made of silicone, but not necessarily so. In certain embodiments, pot 10 may include features such as handles 12, and a bottom ring 14, but not necessarily so. In certain embodiments, pot 10 and trivet 16 may be circular, but not necessarily so.

In embodiments, ridges 18 of base insert 16 may provide a gridded elevated support surface for a food item, with openings for draining fat. In certain embodiments, base insert 16 may further comprise an outer bottom circular ring disk with a height of approximately 6 mm, wherein ridges 18 (also referred to as gridded food support surface 18) extend from a top surface of the outer ring disk. In some embodiments, gridded food support surface 18 may extend to a height of about 16 mm, to provide an overall height of the base of approximately 22 mm. The gridded food support surface may comprise a plurality of ribs forming side walls and a circular top surface. The side walls may be coupled directly to a top surface of the outer ring disk in perpendicular alignment thereto, and the top surface may extend perpendicularly from a top of the side walls. In some embodiments, each of the plurality of ribs may be approximately 6 mm thick, with a spacing of approximately 6 mm between adjacent ribs. In certain embodiments, ribs forming the circular top surface may alternate in alignment across the 4 quarters of the circular top surface, as shown.

Figure 9:
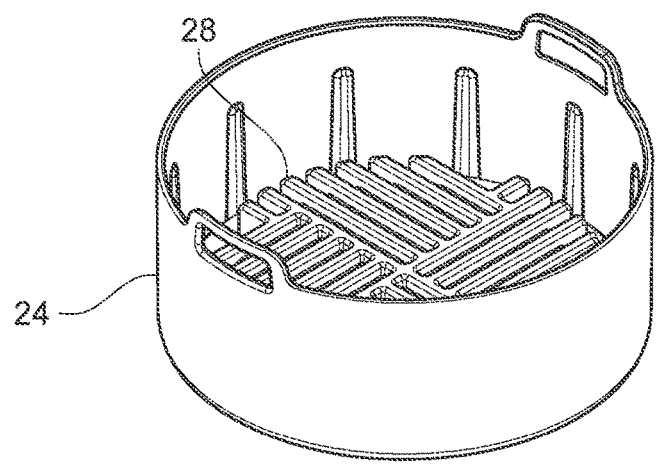
FIG. 9 is a perspective view of an alternate embodiment of the air fryer system, including pot and base insert.
Figure 10:
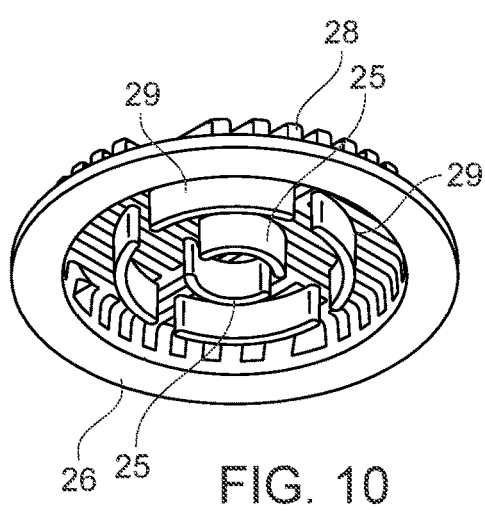
FIG. 10 is a bottom perspective view of the base insert of FIG. 9, according to an alternate embodiment.
Figure 11:
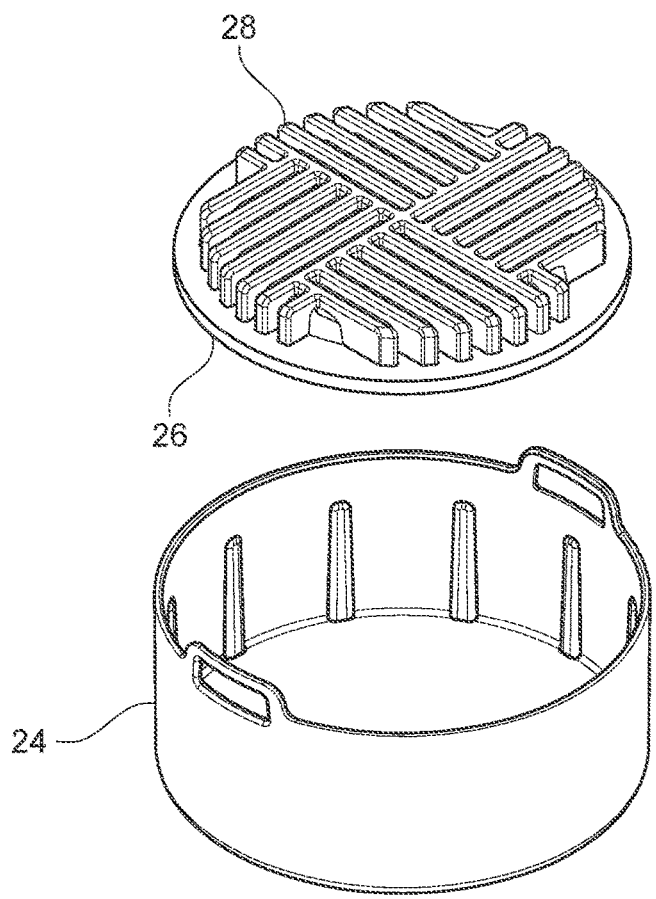
FIG. 11 is an exploded view of the system of FIG. 9, showing the bae insert removed from the pot.

FIG. 9-11 depict an air fryer system similar to that shown in FIGS. 1-8, including a small sized silicone pot 24 which is similar to pot 10; a small sized silicone base insert 26, similar to base insert 16, and including small sized ridges 28, similar to ridges 18.

Figure 4:
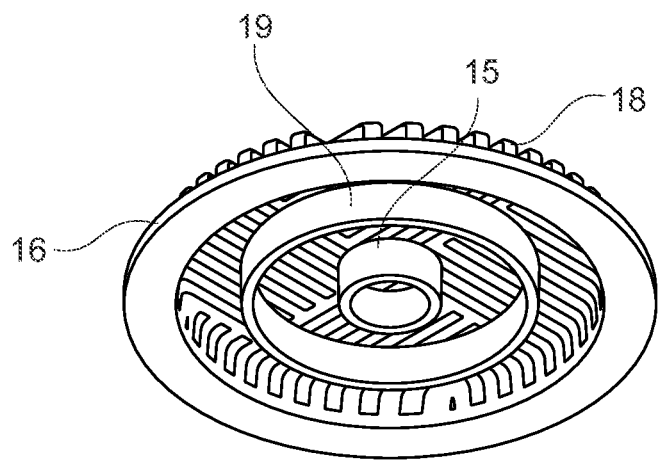
FIG. 4 is a bottom perspective view of the base insert.
Figure 5:
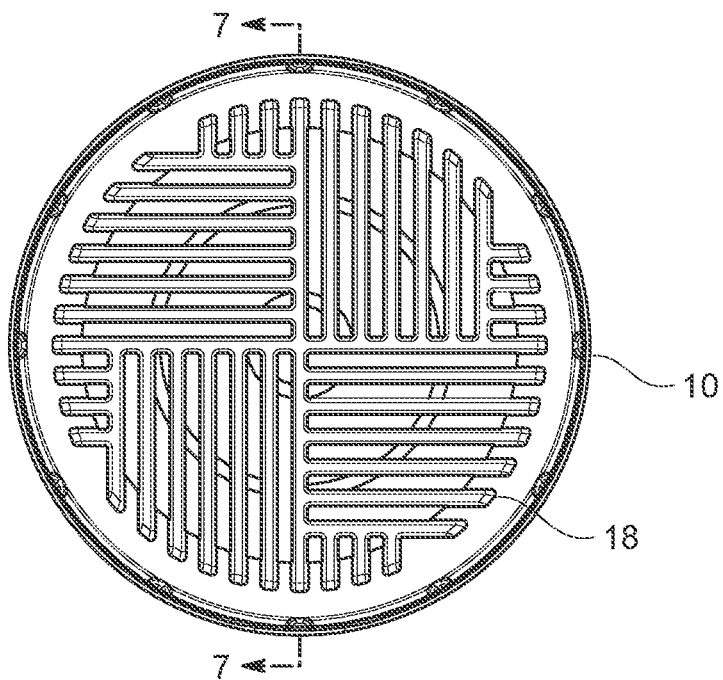
FIG. 5 is a top plan view of the base insert.
Figure 6:
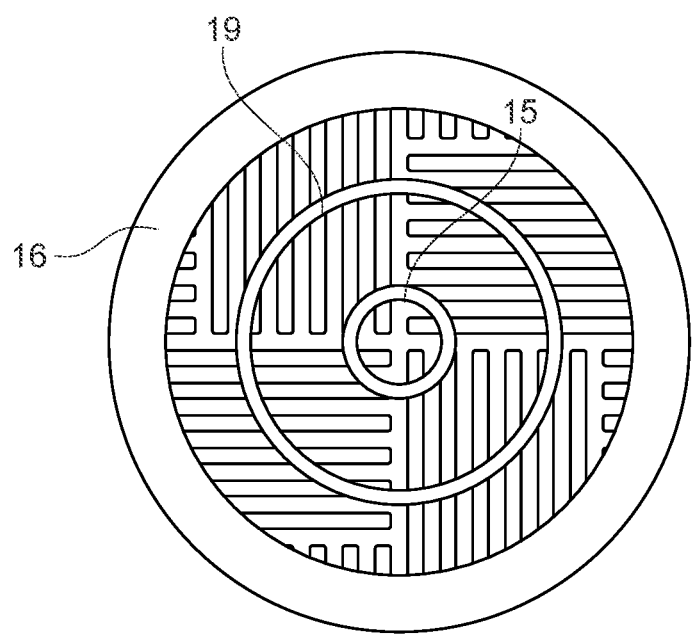
FIG. 6 is a bottom plan view of the air fryer system.
Figure 7:
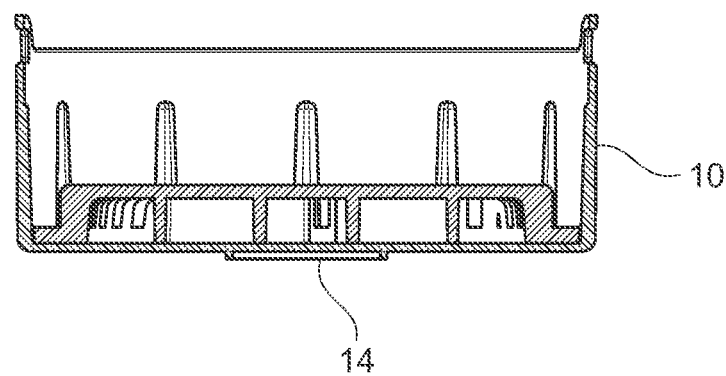
FIG. 7 is a section view taken along line 7-7 in FIG. 5.
Figure 8:
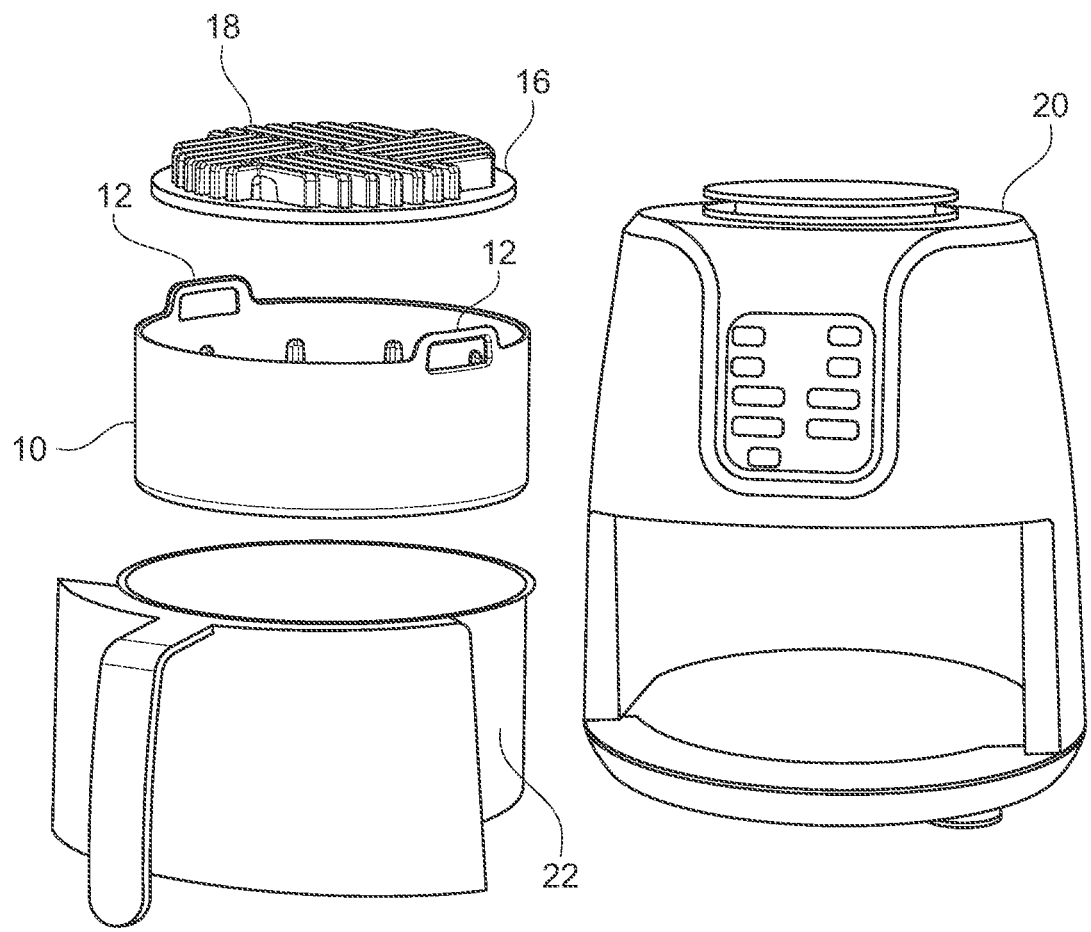
FIG. 8 is perspective view showing the pot and base insert, with an air fryer device and an air fryer basket.

In certain embodiments, inner supports forming one or more rings may extend from a bottom side of the circular top surface to the bottom of the base insert. According to an exemplary embodiment, inner supports may comprise 2 rings, but are not limited to this option. In one embodiment as best depicted in FIGS. 4-6, the rings may be complete circles, concentric with, but smaller and higher than outer bottom circular ring disk. According to an exemplary embodiment, these rings may include an inner ring 15 and an outer ring 19. In an alternate embodiment as best depicted in FIG. 10, the rings may be circles having gaps. These circles with gaps are also concentric with, but smaller and higher than outer bottom circular ring disk. According to an exemplary embodiment, the circles with gaps may include an inner circle 25 and an outer circle 29. The rings provide improved air circulation, and are effective in keeping a food item away from its drained fat. In certain embodiments, an outermost circle of the inner supports may include 4 gaps which approximately delineate the 4 quarters of the circular top surface, while an inner circle may include 2 gaps as shown.

As such, the disclosed subject matter provides an air fryer system with base insert that effectively elevates the food item to be cooked away from the bottom of the pot, whereby the openings allow the fat of the food item to drain into the bottom of the pan, so that the fat is separated from the food item. The disclosed system provides improved circulation and fat draining, to help prevent fat from touching food as it is being cooked. The base insert further provides a leveled top surface which enables it to be used in baking with improved air circulation. It shall be appreciated that the pot may be used without the air fryer base insert if desired, and may be converted to an air fryer cooker by inserting the base.

It shall be appreciated that the disclosed air fryer system can have multiple configurations in different embodiments. It shall be appreciated that the components of the air fryer system described in several embodiments herein may comprise any alternative known materials in the field and be of any size and/or dimensions. It shall be appreciated that the components of the air fryer system described herein may be manufactured and assembled using any known techniques in the field. Furthermore, the components of the air fryer system may be sold together or separately.

As used herein, the articles "a" and "an" are intended to include one or more items, and may be used interchangeably with "one or more." Where only one item is intended, the term "one" or similar language is used. Also, as used herein, the terms "has", "have", "having", "with" or the like are intended to be open-ended terms. Further, the phrase "based on" is intended to mean "based, at least in part, on" unless explicitly stated otherwise.

The constituent elements of the disclosed device and system listed herein are intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device. Terms such as 'approximate,' 'approximately,' 'about,' etc., as used herein indicate a deviation of within +/−10%. Relationships between the various elements of the disclosed device as described herein are presented as illustrative examples only, and not intended to limit the scope or nature of the relationships between the various elements. Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A base insert for an air fryer system, the base insert being insertable and removable from a pot of the air fryer system for cooking a food item, the base insert comprising:
    an outer bottom circular ring disk, and a gridded food support surface which extends from a top surface of the outer ring disk,
    wherein the gridded food support surface comprising a plurality of ribs forming side walls and a circular top surface, the side walls being coupled directly to a top surface of the outer ring disk in perpendicular alignment thereto, and the top surface extending perpendicularly from a top of the side walls, wherein the ribs forming the circular top surface alternate in alignment across the four quarters of the circular top surface;
    inner supports forming circular rings extending from a bottom side of the circular top surface to the bottom of the base insert, wherein the circular rings are concentric with, but smaller diameter and higher than the outer bottom circular ring disk.

2. The base insert of claim 1, wherein the circular rings of the inner supports include gaps within circular rings to provide improved air circulation for the food item being cooked.

* * * * *